United States Patent [19]
Bui et al.

[11] Patent Number: 5,790,125
[45] Date of Patent: Aug. 4, 1998

[54] SYSTEM AND METHOD FOR USE IN A COMPUTERIZED IMAGING SYSTEM TO EFFICIENTLY TRANSFER GRAPHICS INFORMATION TO A GRAPHICS SUBSYSTEM EMPLOYING MASKED SPAN

[75] Inventors: Thuy-Linh Tran Bui; Charles Ray Johns; John Thomas Roberson; John Fred Spannaus, all of Austin, Tex.

[73] Assignee: International Business Machines Corporation, Armonk, N.Y.

[21] Appl. No.: 636,093

[22] Filed: Apr. 22, 1996

[51] Int. Cl.$^6$ .................................................. G06T 11/00
[52] U.S. Cl. .................................... 345/435; 345/429
[58] Field of Search .................... 345/402, 427, 345/429, 329, 333, 334, 335, 435; 364/521

[56] References Cited

U.S. PATENT DOCUMENTS

| | | | |
|---|---|---|---|
| 4,862,388 | 8/1989 | Bunker | 364/521 |
| 5,230,039 | 7/1993 | Grossman et al. | 395/130 |
| 5,265,214 | 11/1993 | Nitta | 395/122 |
| 5,266,941 | 11/1993 | Akeley et al. | 345/201 |
| 5,293,467 | 3/1994 | Buchner et al. | 395/122 |
| 5,299,309 | 3/1994 | Kuo et al. | 395/162 |
| 5,369,739 | 11/1994 | Akeley | 395/134 |
| 5,394,170 | 2/1995 | Akeley et al. | 345/189 |

FOREIGN PATENT DOCUMENTS

0 116 737 A  8/1984  European Pat. Off.

*Primary Examiner*—Mark K. Zimmerman
*Assistant Examiner*—Huedung X. Cao
*Attorney, Agent, or Firm*—Robert M. Carwell

[57] ABSTRACT

Graphics information is efficiently transferred from a host computer to a graphics subsystem in which rendering and pixel data is generated by the host system. A masked span operation provides an assist for 3D rendering performed by the system processor of the host and other system resources. Storage of depth, alpha, stencil, and other pixel data is in system memory including one or more ancillary graphics buffers. The main processor of the host system generates pixel data associated with an image. This data is checked against the buffers. As a result of such checking, a mask is generated by the host system. The mask is transferred in burst mode across the host-graphic subsystem PCI bus to the graphics subsystem in combination with span width, and in the case of interpolated color, color base and color increment data, and X,Y coordinate of the first pixel. In the graphics subsystem the mask is employed with the other data to load the frame buffer with the portion of pixel data defined by the mask.

4 Claims, 7 Drawing Sheets

Poly Span Commands

| Supported Command Variations | Op Code 108 | Initial Parms 104 | Primitive Data Structure 106 |
|---|---|---|---|
| Poly Span | 0x8402 | None | {[x_n,y_n],[-,W]} |
| Poly Masked Span | 0x8502 | None | {[x_n,y_n],[-,W],[Mask]} |
| Poly Span Interpolated Color | 0x8ca5 | [delR],[delG],[delB] | {[inR],[inG],[inB], [x_n,y_n],[-,W]} |
| Poly Masked Span with Interpolated Color | 0x8da5 | [delR],[delG],[delB] | {[inR],[inG],[inB], [x_n,y_n],[-,W],[Mask]} |

SYSTEM AND METHOD FOR USE IN A COMPUTERIZED IMAGING SYSTEM TO EFFICIENTLY TRANSFER GRAPHICS INFORMATION TO A GRAPHICS SUBSYSTEM EMPLOYING MASKED SPAN

TECHNICAL FIELD

The present invention relates generally to computer graphics systems and, more particularly, to such systems providing display graphics subsystems requiring efficient transfer of graphics information between the computer main system and graphics subsystem.

BACKGROUND OF THE INVENTION

In the computer graphics field, many types of graphics systems are utilized. Typically, however, such systems provide for a host computer which performs some of the tasks related to processing of graphics information and a related graphics subsystem typically including a graphics adapter which performs yet additional functions. The latter may, for example, include arranging the graphics information in a form appropriate for output to graphics output devices which actually display the graphics.

In the development of the art, this division of labor in generating, processing and displaying graphics information between the host computer and the graphics subsystem has taken many forms. Because much depended upon the particular characteristics of the host computer and graphics subsystem, necessary functions might alternatively be provided by either the host computer or the graphics subsystem itself. In one embodiment of a computerized imaging system, this division of labor takes a form in which the main processor(s) of the host computer system performs rendering of pixels and the resulting final pixel data is to be transferred to the graphics subsystem. The graphics subsystem will then, in turn, place appropriate pixels in a frame buffer which is thereafter utilized to generate the graphics image.

In contrast, for purposes of illustration, in other such systems, it is the graphics adapter which may be employed to do the rendering and, of course, the presentation of the graphics information in appropriate format for use by a suitable graphics output device. Although full 3D engines are being provided in graphics adapter cards for example, wherein all processing occurs relative to the graphics on the graphics adapter and it becomes an entire subsystem for performing the specialized graphics functions, these systems are relatively new and expensive—in part because of the requirement for more sophisticated and expensive graphics adapter processors for handling all of the graphics processing, and the additional requirement for sufficient graphics adapter memory. Thus, this solution of offloading all graphics functionality onto a separate subsystem is, as a practical matter, as of yet not a viable solution to providing widespread high quality graphics, but rather is best suited for niche markets wherein the added cost can be justified, such as in engineering workstations or the like.

Yet other reasons exist for alternative solutions to dedicated high function graphics subsystems. Typically in high capability computer systems, excess "silicon" or capacity may be available on central processing units or controller chips for offloading some of the graphics functionality from the graphics subsystem and onto the host computer. In other words, this excess processing capacity not being used by the host computer may thereby be taken advantage of essentially for "free" by implementing graphics functions in the processor or memory controller itself which would otherwise have to be provided for in the dedicated graphics subsystem.

Thus for example, some microprocessor manufacturers have been providing new processor instructions to assist in the increasingly important area of providing better graphics and in assisting in 3D rendering and multimedia functions, such as providing for specific instructions for block moves, etc.

As just described, for higher function graphics like 3D rendering, it is possible to provide dedicated graphics subsystems, including more expensive graphics adapters with additional memory to handle things such as depth (Z) buffering, other associated memory for storing alpha planes, additional logic, etc. However, the industry has been seeking to better utilize system resources to thereby reduce the cost of providing higher quality graphics. Thus, instead of requiring more fast video memory in a graphics adapter, for example, there has been some interest in better utilizing main memory and processing of the host computer in the processor complex for storage of depth, alpha, or transparency factors, etc.

However, seeking to utilize more under-used resources of the host computer for graphics and thereby distributing graphics functions between the host computer and graphics adapter are not without their problems. First, problems are created in transferring the increasingly dense graphics information over a bus of limited bandwidth to the graphics subsystem. Also, in this modern age of compartmentalization, where designers may specialize only in graphics adapters or main processor or memory controller design, the necessary integrated systems perspective and skills may be missing which require designers to be equally conversant in main system and graphics subsystem design issues and constraints. Thus, opportunities to capitalize upon unexpected benefits to a distributed graphics design approach may not be readily apparent or easily discernible.

It is nevertheless conventional that in the graphics imaging art, the system or main memory and processor of the host computer are employed to share at least some extent in the graphics processing workload. More particularly, such system memory will typically contain a plurality of ancillary graphics buffers which will contain information necessary to operate on the base graphics data to achieve desired effects on the viewer. For example, these ancillary buffers might include a depth buffer, alpha buffer, stencil buffer, etc., utilized in a manner well known in the art to process the graphics information such that when finally displayed, 3D or depth, various surface characteristics, and the like are perceived by the viewer. With the advent of significantly increased processing power in modern host computers such as workstations and the like, typically excess processing power is available in the main system processors. They are thus ideally suited for performing the incredibly complex and time consuming checking against these buffers before rendering pixels and transmitting them to the graphics subsystem for subsequent display. As previously noted however, depending upon the particular needs of the system, this checking against buffers may alternatively be provided by special graphics assist hardware having the necessary processing power in the graphics adapter processor.

In any case, the important point to note is that as a result of this checking against ancillary graphics buffers, some pixels of a given image may not need to be rendered. As but one simple example, portions of pixels comprising an image in a three-dimensional system may be obscured from the viewer by reason of another object in a plane between the distant object and the viewer. In a display of an eclipse for example, a portion of the pixels associated with the Sun's image might be obscured by the presence of the obstructing moon between the viewer on earth and the sun. It is significant to note that notwithstanding that some pixels may thus not need to be rendered, it may nevertheless be necessary to maintain address information on a per pixel basis, including the addresses of the pixels which may not be rendered. Otherwise, the graphics subsystem would have no way of determining which pixels in a mass of pixels relating to an image need not be rendered as a result of the aforementioned ancillary buffer checking.

It is this need to retain address information on a per pixel basis which gives rise to a serious problem addressed by the subject invention. In a modern high resolution graphics imaging system, an incredible volume of pixel data must be transferred between the host computer and the graphics subsystem. For example, even in what would be considered to be a relatively moderate resolution display in modern terms, a 1280×1024 pixel display screen may be provided, e.g., with 1024 lines of 1280 pixels each, each with their own unique pixel address. Each pixel itself may have associated with it color depth information such as, in high color resolution systems, a 24 bit number. With this sheer volume of graphics data, including a large number of pixels, large number of bits per pixel of pixel data, and large number of unique individual addresses associated with pixel, it will be readily apparent that by offloading some graphics functionality from a dedicated graphics subsystem to a main system, a problem is thereby created in accommodating a limited bandwidth of a bus interconnecting the main system and graphics subsystem. It becomes impractical if not impossible to convey across such a bus, even a modern PCI bus with a "burst" mode, all of the necessary various pixel data, addresses, and various aforementioned ancillary check data necessary for 3D rendering.

Thus, a system was highly desired which could effectively distribute graphics implementation between a host computer and graphics subsystem to enjoy the associated cost advantage of employing excess host capability while at the same time avoiding the necessity of a high-end graphics subsystem with all graphics operations being implemented in the graphics subsystem itself.

Still further, it was desirable to provide for such distributed implementation of graphics while nevertheless addressing the aforementioned problem of bottlenecks associated with bus structures interconnecting the host system and graphics subsystems.

SUMMARY OF THE INVENTION

The present invention provides a system and method for efficiently transferring graphics information from a host computer process complex to a graphics subsystem in which rendering and final pixel data is generated by the host system.

A masked span operation is provided, which, in a preferred embodiment, provides an assist for 3D rendering performed by the system processor of the host and other system resources. Storage of depth, alpha, stencil, and other pixel data are provided for in system or main memory of the host computer, including one or more ancillary graphics buffers associated therewith. The main processor(s) of the host system generates pixel data associated with an image. This data is checked against the buffers prior to transfer to a graphics subsystem over a bus. As a result of such checking, a mask is generated by the host system which will be transferred to the graphics subsystem in combination with pixel data, such mask providing a simplified composite of the ancillary buffer checks performed by the host.

In a preferred embodiment, the most significant bit of the mask controls update of the first, e.g., most significant, pixel of data following the mask. Each subsequent mask bit controls the update of the next sequential pixel. Accordingly, a span command is provided for in the system which, in a preferred embodiment, is of the format [Poly Span Command (opcode, count of data structures transferred between host-graphics subsystem)] [address of first pixel] [width, e.g., count of number of pixels rendered by the graphics subsystem] [mask(s)]. Thus, in order to update, as an example, pixels (0,0), (4,0), and (8,0) to a frame buffer component of the graphics subsystem employing the aforementioned span command in accordance with the invention, the host system will simply communicate the poly span command/count, the address of the first pixel (0,0), the width of 9, and the mask of B100010001 over the bus, such as a PCI bus interconnecting the host and graphics subsystems. Significant increase in efficiency of transfer of graphics data between the host and graphics subsystem are thereby effected by use of the masked span command. Without the use of the masked span command, multiple span commands would be required to generate the aforementioned span of width 9 and mask of B100010001. Moreover, in the graphics subsystem, this mask is employed to determine a subset of the pixel rendering data thus previously transferred to the graphics subsystem, such subset of pixels thereby being written to a frame buffer of the graphics subsystem for subsequent display on an associated graphics output device interconnected to the graphics subsystem.

A poly span command provides for differing variations of span as required including the basic poly span, poly masked span, poly span interpolated color, and poly masked span with interpolated color, the latter being the most general case. In the case where varying color is present in the span wherein the variances in predetermined increments, additional efficiency in transmission of graphics data from the host to the graphics subsystem is provided to accommodate the color. More particularly, simplified color data is provided over the host-graphics subsystem bus as opposed to individualized complete color data associated with each pixel whereby the graphics subsystem, employing this simplified color data, may then interpolate color for each pixel in addition to employing the mask to determine which pixels are displayed. In the preferred embodiment for color, an initial data structure of the form [delta red], [delta green], [delta blue] is provided and transmitted from the host to the graphics subsystem, wherein a delta integer and delta fraction for each color is provided indicating the increment by which each successive pixel's color will be changed relative to the preceding pixel. This initial data structure pertains to all spans within the poly span command. In like manner, a primitive data structure is provided of the form [initial red], [initial green], [initial blue] wherein each color, a starting color base is provided comprised of an initial integer and fraction component for a given color. As with the initial data structure, this primitive data structure corresponds to the pixels in the span. Thus the graphics controller itself may, for each pixel of the span to be displayed, calculate its color from the corresponding initial color of the first pixel in the span and the color increment which defines the amount which color changes in successive adjacent pixels in the span.

DETAILED DESCRIPTION OF THE PREFERRED EMBODIMENT

In computerized graphical imaging systems, enhanced capability is continuously soughtafter in terms of more pixels per image, increased color resolution, full motion video, and the like. This in turn contributes to the serious problem of being able to efficiently transfer increasingly large amounts of information over a bus of limited bandwidth interconnecting the host system and graphics subsystems. The desire for additional features provided by associated depth, alpha, etc., buffers and associated checking, and the problem of efficient transfer of graphics information between the host computer and graphics subsystem is even further exacerbated by the need to maintain the address information related to this checking on a per pixel basis. Bus bandwidth limitations preclude transfer of individual pixel addresses across the bus which would appear necessary for identifying in the graphics subsystem which pixels will not be displayed as a result of the host checks against the ancillary buffers.

Accordingly, a transfer method was highly sought which could send the results from the system memory's checks against the ancillary buffers and the color data relating to each pixel to a graphics subsystem while at the same time minimizing the address overhead.

Figure 1:
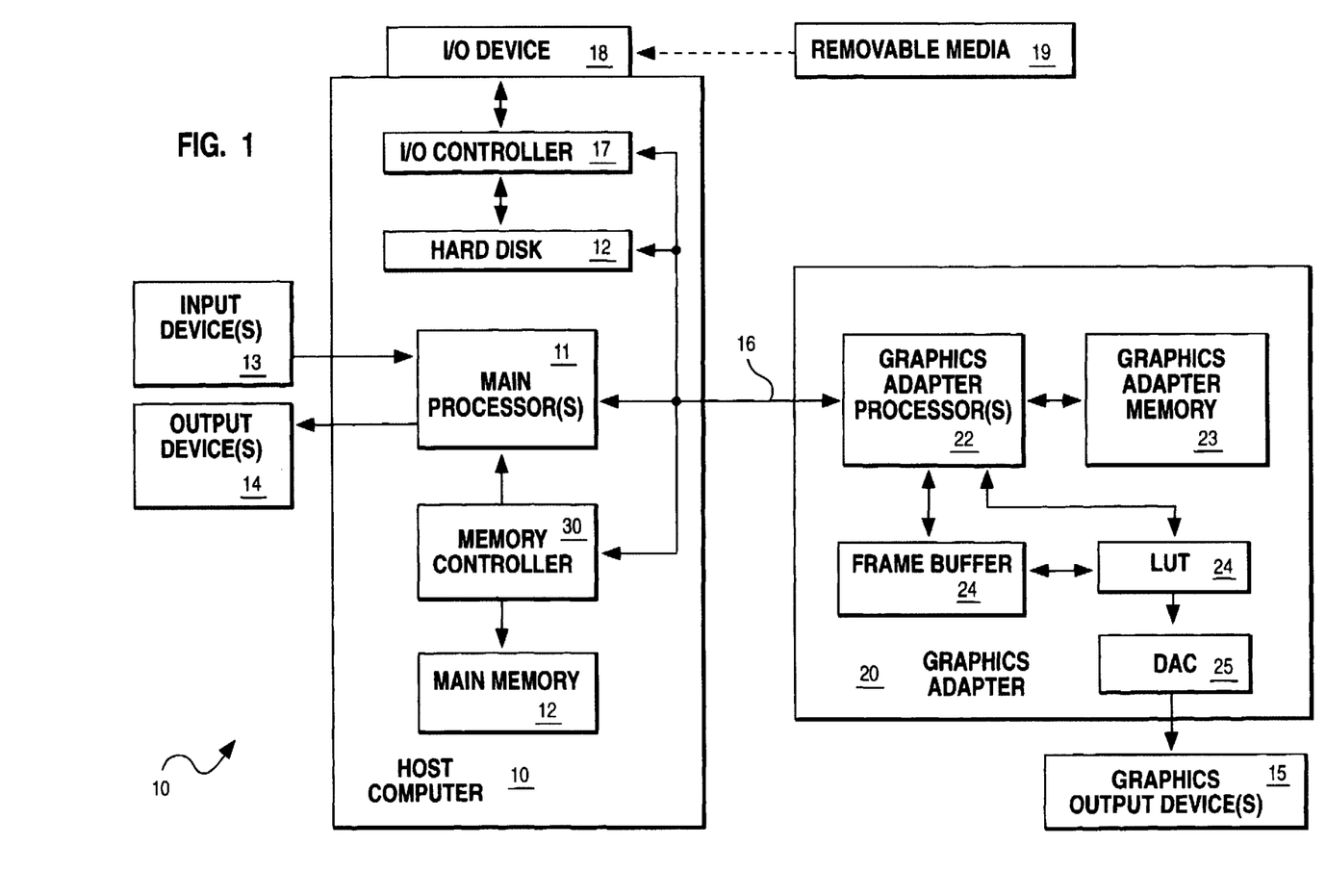
FIG. 1 is a block diagram of a digital computer system including the mechanism for efficient transfer of graphics information in accordance with invention.

FIG. 1 is a block diagram of a digital computer system 10 employed in a preferred embodiment of the invention. Such computer may take the form of a workstation such as the RISC-based systems marketed by the IBM Corporation, although the invention is not intended to be so limited and is equally applicable to essentially any computer system employing a graphics subsystem for purposes of display of graphics information.

Still referring to FIG. 1, the computer includes one or more main processors 11, coupled to a main memory 12, and a hard disk 12A of the host 10A. Conventional input and output devices 13 and 14, respectively, are attached to the host. Such input devices may include a keyboard, mouse, tablet, or other types of input devices. Output device(s) 14, may include a text monitor, plotter, or other well known output devices. A computer readable removable media 19, such as a familiar diskette or compact disk, may be inserted into the input/output device 18, such as a disk drive or CD ROM drive. Data is read from or written to the removable media by I/O device 18 under control of the I/O device controller 17. The I/O device controller communicates with the main processor(s) through a bus 16. Main memory 12, hard disk 12A, and removable media 19 are all referred to as "memory" for storing data for processing by main processor(s) 11.

The main processor 11 is also coupled to a suitable graphics output device(s) 15, such as a graphics display through a graphics subsystem which, in a typical embodiment, may be comprised of a graphics adapter 20 or other appropriate graphics subsystem form function. The graphics adapter 20 receives instructions regarding graphics from the main processor 11 on bus 16. The graphics adapter then executes these instructions with a graphics adapter processor(s) 22, coupled to a graphics adapter memory 23. It will noted that this graphics adapter memory 23 is often associated with higher-end graphics subsystems providing enhanced graphics functionality, and that in other systems, necessity for such dedicated graphics adapter memory 23 may be obviated. The graphics processors 22 in the graphics adapter are essentially the graphics rendering engine which execute the instructions received over the bus from the main processor and, as a result, update one or more frame buffers 24 based on execution of those instructions. The frame buffers 24 are essentially video random access memory (VRAM) with fast access time. They are used to store data for every pixel to be displayed on the graphics output device, with a lookup table (LUT) 24A, containing a palette of colors referenced by the data in the frame buffer 24. A DAC (digital-to-analog converter) 25 converts the digital data stored in the frame buffer(s) into appropriate signals such as the familiar "RGB" video signals, which are then provided to the graphics display 15, thereby resulting in the visual display of the desired graphics output from the main processor. Conventionally, the LUT 24A and DAC 25 comprise a random-access-memory digital-to-analog convertor or "RAMDAC".

The host system 10A further includes a memory controller 30 interconnected to the main processor 11 and main memory 12 and the bus 16 for purposes of controlling the processing and storage of the graphical information residing in the main memory 12 which is associated with pixels to be displayed. More particularly, as will be hereinafter described in greater detail, an important function of this memory controller is to control the "checking" of graphics data against various ancillary buffers which, in turn, contain information which will, in turn, control which pixels are to be rendered and displayed, and the manner in which this is to be done. This checking function of the memory controller 30 may typically be implemented in hardware although it could be implemented in software.

As a passing example of use of ancillary buffers, a "depth" or "Z" buffer may be included in the main memory 12. When a given pixel of an image is being processed, the system 10 may be called upon to determine if there is an object in the foreground obscuring the visibility of this pixel so as to provide the illusion of depth of an image (wherein the pixel may desirably not be displayed by reason of presence of another image between that pixel's image and the viewer). Accordingly, one such form of "checking" which is performed by the main processor 11 in conjunction with the memory controller 30 and main memory 12, is to check this Z buffer in the main memory 12 at a location corresponding to the location of the given pixel. This check is to determine if there is in fact another pixel associated with another image at that same location which would obscure the viewing of the original pixel. This ancillary buffer checking will be described in greater detail later.

Figure 2:
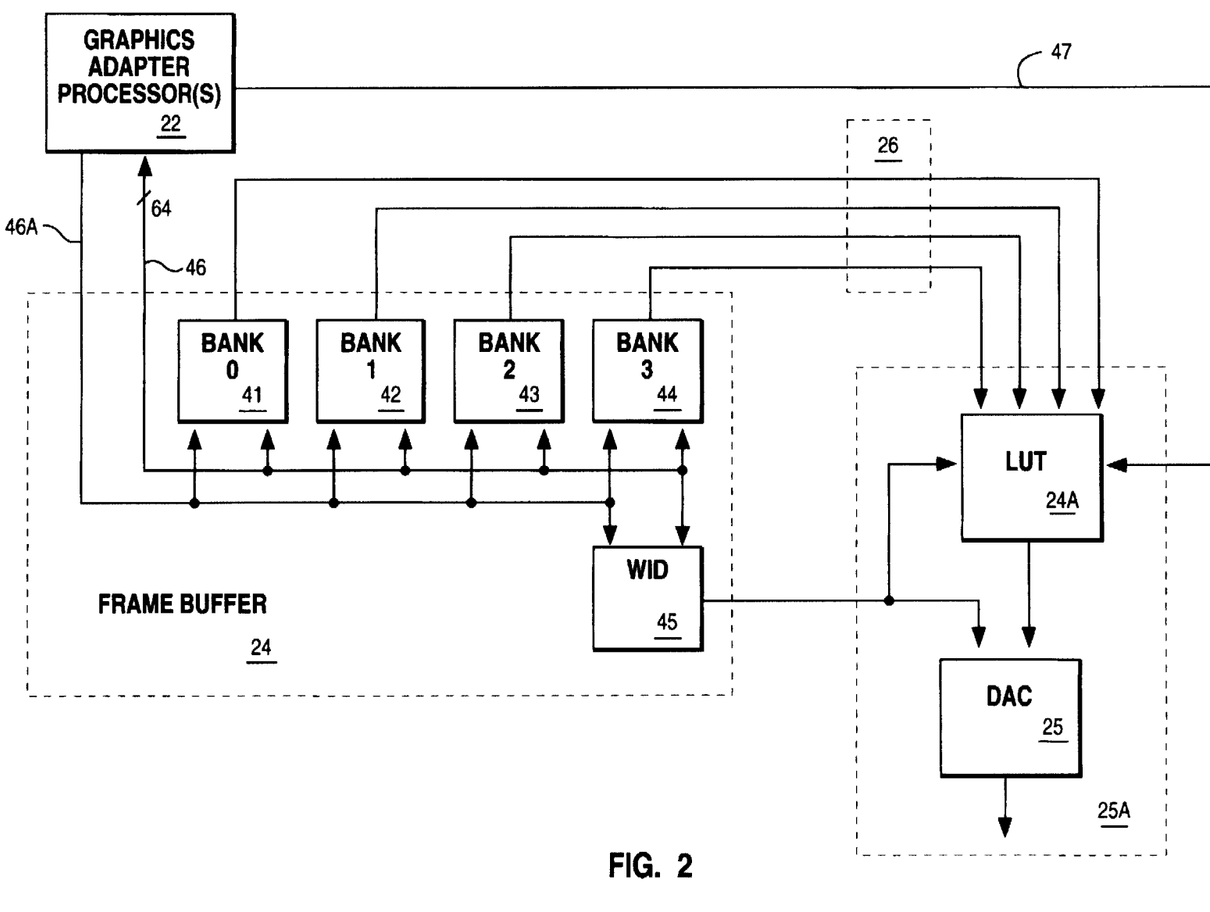
FIG. 2 is a detailed block diagram of portions of the graphics adapter portion of FIG. 1.

Turning now to FIG. 2, as previously noted the present invention is desirably implemented in a preferred embodiment in conjunction with a graphics adapter 20 shown in FIG. 1. FIG. 2 is a detailed block diagram of portions of the graphics adapter 20 described above with reference to FIG. 1. These portions of the graphics adapter 20 comprise a graphics processor 22, frame buffer memory 24, and RAM- DAC 25A. The frame buffer 24, in a typical embodiment, will further include multiple memory banks such as banks 0–3 (reference numerals 41–44, respectively, which may be referred to hereinafter as memory banks 0–3). Also included in the frame buffer preferably is a window identifier memory (WID) 45. The graphics processor 22 is connected to the memory banks 0–3 and the WID 45 of the frame buffer 24 by an appropriate interface bus 46 and pixel address bus 46A. The memory banks are used for storing pixel data to be displayed on the screen of the graphics output device 15. The pixel data is updated by the graphics processor via the bus interface 46, based upon addresses provided across the pixel address bus 46A.

The details of the masked span format will be described in greater detail with reference to FIGS. 3 and 4. However, before getting into details of the address and format implementation of FIGS. 3 and 4, reference is herein made to FIG. 6 which is a conceptual drawing illustrating how the invention works.

A representative system memory map, 62, reflects the various components of memory in a typical computerized graphics station. Thus, for example, read only memory (ROM) is shown which typically includes, for example, initial program load or boot code; real memory 12 is also shown represented corresponding to the main memory of the host computer in FIG. 1; and a section of the memory map is reserved for the frame buffer 24, also shown in FIG. 1. To the right of the system memory map 62 is a graphic depiction conceptually illustrating an expansion of the frame buffer 24 portion of the system memory map 62. The frame buffer at a given time will be comprised of a plurality of sections of the buffer, each associated with a unique line number on a graphics display such as the screen 68 shown in FIG. 6. A typical display might contain, for example, 768 such lines of pixels, each line in turn being comprised of, for example, 1024 pixels. For illustrative purposes, a span "A", 66, is depicted in the middle of the frame buffer expansion 64, which may also be seen conceptually illustrated in the representation of the display screen 68.

Figure 6:
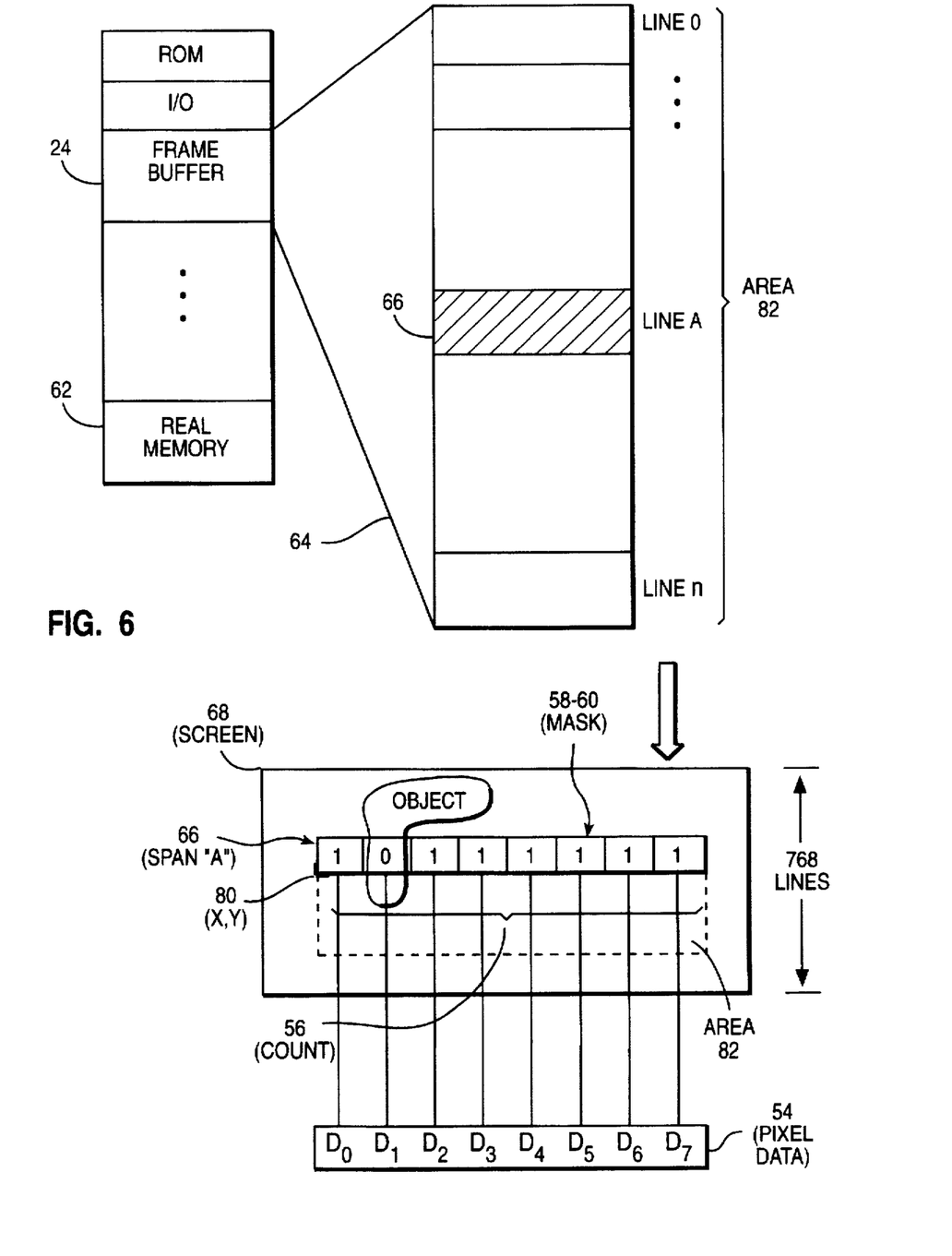
FIG. 6 is a conceptual illustration of the operation of the components of the invention.

Also, for purposes of illustration, it may be assumed that an object 70 is present in the foreground which would obscure the view of image information associated with a pixel lying under the box 72. It will be recognized that this corresponds to "depth" information which may be contained in a Z buffer stored in the main memory 12 of FIG. 1. The line "A" may be seen to correspond to a plurality of horizontal pixels conceptually depicted by the horizontal line of squares in the middle of screen 68.

It will be recalled from the foregoing description that the main processor 11 will check these ancillary buffers such as the depth or Z buffer in main memory 12 and accordingly determine that although a pixel associated with the image beneath box 72 may be rendered, nevertheless (because of the presence of object 70 in the foreground at box 72), the actual pixel associated with the rendering will be obscured and thus never displayed on the graphics output device 15. It is a significant feature of the invention, however, that in order to effect the avoidance of display of this underlying pixel under box 72, it is not necessary to transfer over the bus 16 the unique spans associated with each visible portion of the span 72 from the main processor 11 to the graphics adapter 20. This avoidance of transmitting unique spans associated with each visible portion of span A(66), for example, results in significant gains in efficiency in transfer of graphics information across the limited-bandwidth bus 16 as will become more apparent with the following description.

Still referencing FIG. 6, in doing the ancillary buffer checking on the host with the main processor 11 in conjunction with the ancillary buffers contained in the main memory 12, the main processor 11 will generate a mask 82. This mask is, in fundamental concept, a series of 1's and 0's which indicate whether a pixel associated with each position in the mask will be displayed or not. Accordingly, in the very simplified illustration of FIG. 6, it will be noted that a "0" is present in the mask 82 at the position associated with the pixel box 72. This signifies that this particular pixel underlying the box 72 will not be displayed because its view is obstructed by presence of the object 70 which overlays the area delineated by the box 72. The original pixel under box 72 would otherwise be displayed but for the presence of the object 70.

Thus, in accordance with the invention, this mask 82 will be generated by the main processor 11 as a result of the ancillary buffer checking, and will be transmitted over the bus 16 to the graphics adapter 20. As will become more apparent later, it is this mask which allows for omission of additional span commands transmitted within the bus burst structure.

Also in accordance with the invention, the main processor 11 will transmit over the bus 16 to the graphics adapter 20 a few other important parameters necessary to display the plurality of lines which will comprise the area 82 of the display screen 68 in FIG. 6. First, the starting address corresponding to the initial X,Y coordinate 80 of the first pixel of span A(66) will be transmitted. Secondly, span width 56 will be transmitted functionally related to the number of pixels associated with the span to be displayed.

Additionally as aforementioned, the mask 58–60 will be transmitted by the main processor 11 to the graphics subsystem wherein a bit is provided associated with each pixel to be displayed.

Figure 4A:
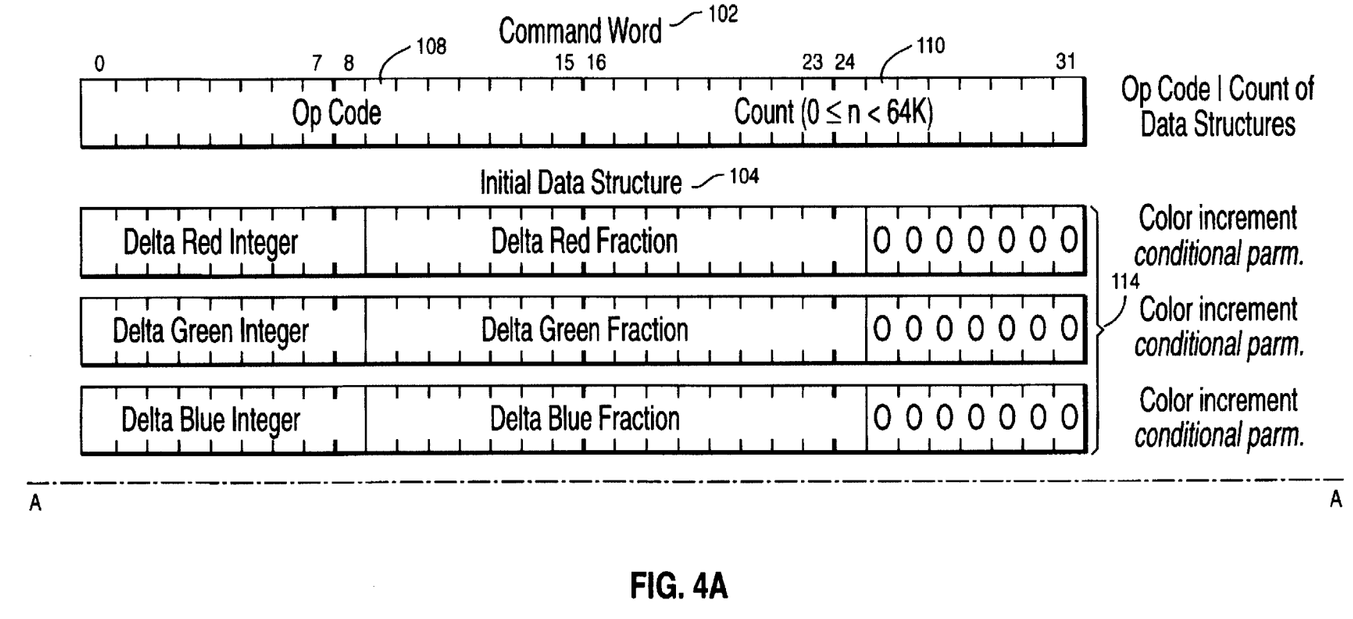
FIG. 4 is a detailed illustration of the poly span command definition in accordance with a preferred embodiment of the invention.
Figure 4B:
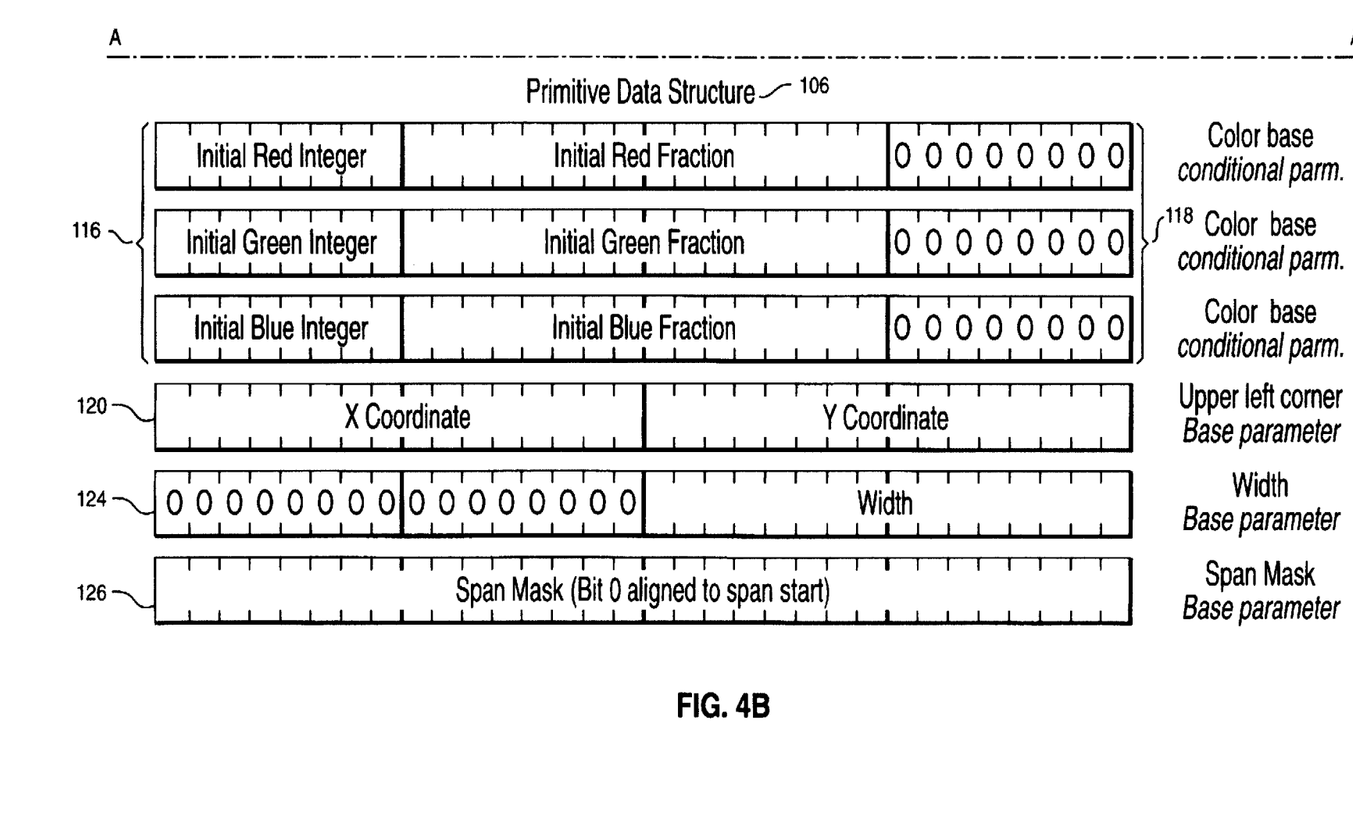

A very important feature must be noted with respect to the selection of the parameters to be transmitted, as illustrated in FIG. 4, e.g., the starting X,Y coordinate 120, width 124, mask 126, and color data 116 and 118. It will be noted that only one span has been transmitted over the bus 16 associated with the image data which will comprise the span, specifically the starting address X,Y of span A.

The use of the masked span allows the graphics controller to generate the color pixel data for the span, while the ancillary buffer checking is performed by the CPU or dedicated hardware within the host system.

With respect to span A of FIG. 6, in employing the poly masked span of the invention, in one embodiment it will be assumed that there is a regularly changing increment of color in adjacent pixels and thus there is no need to transmit from the host to the graphics subsystem initial base color and color increment data. However, in the case in which there is a regularly changing amount of color relative to successive pixels in the span 66 of FIG. 6, the interpolated color feature of the invention will be provided for. In this instance, with respect to the span represented by span 66, a given color will be either increasing or decreasing in regular amounts as one progresses from the first pixel 71 to the last pixel 73 of the span. In such a case, rather than transmitting full color data for each such pixel comprising the span, a species of the poly span command is employed which uses an interpolated color feature as shown in the last two command variations of FIG. 3. In such instances, in order to avoid transmission of the entire color information for each pixel, only color data relating to a color base and color increment are transmitted. More specifically, an initial integer and fraction is transmitted for each color in a primitive data structure 106 (FIG. 4) which represents the initial color or color base of the first pixel 71 of the span. Similarly, in the initial data structure 104 (FIG. 4) only the color increment for each color is transmitted in the form of a delta integer and delta fraction for each color. When the graphics subsystem receives this color base and color increment information, it is able to calculate what the particular color is of a given pixel in the span of span A because it knows what the initial RGB color is for the first pixel 71 (by reason of the color base data in the primitive data structure), and the graphics processor may further calculate the particular color of a given pixel by incrementing these base colors by the color increment in accordance with the position of the particular pixel in the span 66.

Now that an overall understanding has been gained of the operation of the invention, more detail will be provided as to the particular preferred embodiment and, more specifically, the format of the poly masked span in a practical implementation.

Instances may arise in imaging where a "span" is present. A span is known in the art as a group of pixels having a constant or interpolated (e.g., regularly varying) color with the same Y address and sequentially increasing X addresses. In such instances, the present invention provides for a "masked span" which will be used wherein the graphics subsystem 20 is employed to render the spans while the system processor 11 or special hardware performs the ancillary bus checking. Thus, the masked span of the invention may be applied advantageously in cases where it is desired to render a span of the same color or wherein it is known how the color will change across the span by means of an interpolated color.

In performing this function, the memory controller 30 will be employed to alter the span generated by the processor 11 into a masked span of the invention which will be transmitted to the graphics adapter 22 across the bus 16. In accordance with the invention, this masked span operation will be performed in response to a command to be further described with reference to FIGS. 3 and 4. Responsive to this command, the memory controller 30 will perform the Z and other ancillary buffer checks and generate a mask(s) transmitted across the bus to the graphics subsystem 20 along with at least the initial X/Y address of the first pixel, width of the span, and a count of the data structures being transmitted, as well as color information as required.

The graphics adapter engine will render the span to the frame buffer 24. The incremental color transmitted across the bus 16 will be employed and the graphics processor 22 will additionally utilize the mask in order to not render certain pixels based upon the ancillary buffer checking performed by the memory controller 30 reflected as a composite in the mask. It will readily be appreciated that as in the case of the masked DFA, the serious problem of the bottleneck caused by the limited bandwidth of the bus 16 is being addressed by the present invention in providing for a masked span. The workload is now being divided wherein the memory controller 30 takes the span and interpolates depth, alpha, etc., e.g., "running" the span in those dimensions, inasmuch as the Z and other buffers are being held, in like manner to the masked DFA situation, in the main memory 12. Therefore, the memory controller 30 progresses through the span incrementing, in the case of the Z dimension, for example, along the entire span performing the individual checks against the ancillary buffer. Now, however, instead of the main processor 11 generating the Z values, the memory controller 30 preferably performs its function in its dedicated hardware of generating the necessary Z values, the result of such checking being a mask.

The memory controller will generate a span width and color deltas which will be employed in interpolating color in the graphics subsystem. Moreover, in a preferred embodiment, these color deltas will not be transmitted the bus 16 on a per span basis, but rather a beginning color per span will be transmitted along with color deltas so as to transfer less data across the bus. In this manner, the workload of generating pixels is distributed between the host computer 10A and the graphics subsystem instead of concentrating the entire workload on either the processor or the subsystem.

Figure 3:
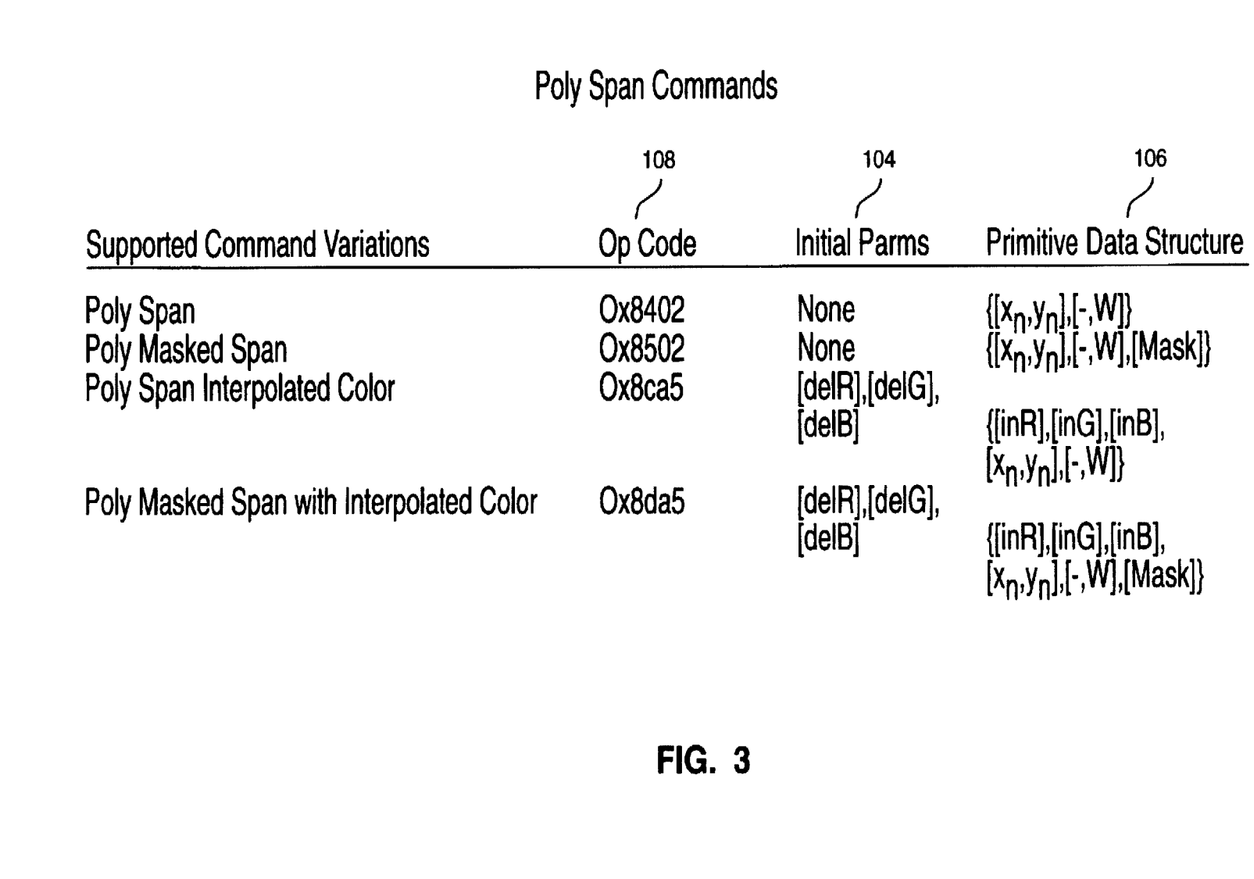
FIG. 3 is a schematic illustration of the addressing format for poly span commands.

Thus, in summary, before discussing in more detail the span commands and details thereof depicted in FIGS. 3-4, similar to the masked DFA operation, the masked span operation will apply the mask to the span as it is generated. The mask bit of "1" will cause the pixel to be updated to the frame buffer, whereas the mask bit of "0" will inhibit updating the pixel to the frame buffer. One mask word is provided for each 32 or fewer bits of span width in a preferred embodiment of the invention. The masked span command is of the general format:

command (opcode, count)
X,Y address
width
mask(s)

In order to update pixels (0,0), (4,0), and (8,0) to the frame buffer utilizing the span command as a specific example, generally only the address of the first pixel (0,0), the width of "9" and the mask of B100010001 need be transmitted across the bus.

Turning now to FIG. 3, more detail is provided of a preferred embodiment of the span command. First, in a preferred embodiment of the command structure, it is implemented as a "poly" span command which, depending upon the particular opcode, represents one of four different span commands. It is simply a matter of which parameters are required which are associated with each particular form of the span command. It will be noted that in accordance with the teachings of employing a mask, two important forms of the poly span command are provided, namely the poly masked span and the poly masked span with interpolated color, the latter being the general case and employing all elements of the data structure. In passing, before providing more detailed description of the span command, it will be noted that it is contemplated by the invention to perform a group of spans with one command, only transmitting the color deltas once per span command in the initial data structure of FIG. 4. FIG. 4 lists the initial red, green, blue colors, the X,Y coordinate of the first pixel, width, and mask, which will be sent per span as hereinafter described.

Turning now to FIG. 3, a table is provided indicating in an actual preferred embodiment, four types of poly span commands determined by the particular opcode associated with the command. As will be shown with reference to FIG. 4 in greater detail, the poly masked span with interpolated color is the most general case which contemplates color changing over the span. Thus, as shown in the column "initial parameters" and "primitive data structure", this more general case will incorporate all the parameters and data structure of the less general command variations.

Turning now to FIG. 4, a command word 102 will specify which of the command variations of FIG. 3 are desired by the particular opcode 108. This command word 102 will further include a count 110, indicating the number of data structures to follow.

Also shown in FIG. 4 is the initial data structure 104 which includes the initial parameters of FIG. 3. This initial data structure will comprise color increments for red, green and blue, each color of which has associated with it a delta integer 112, and a delta fraction 114.

Still referring to FIG. 4, a representative view of the primitive data structure 106 also shown in FIG. 3 is presented. This data structure will include a color base comprised of, for each red, green and blue color, an initial color integer 116 and then an associated initial color fraction 118. The primitive data structure 106 will further include the X,Y coordinate 120 of the left pixel of the span, a representation of the width of the span 124, and the important span mask 126.

Each non-color interpolated span operation (e.g., the first two command variations of FIG. 3) will result in the drawing of a horizontal line in the foreground color of the specified width 124, starting at the specified address 120. Color interpolated span, (e.g., the latter two of FIG. 3), will start at the initial color values specified by the color bases of the primitive data structure 106 (e.g., initial integer and fraction colors 116, 118) and will increment by the delta color values of the initial data structure 104 with each pixel drawn. The delta color values are used for all spans within one poly span command. Also spans are generated in the positive X direction (e.g., left-to-right on the screen) although if desired a control register bit may be provided for which, when set, will implement negative masked or color interpolated spans.

It is desirable to implement masked color interpolated spans and color interpolated spans in either a positive or negative X direction as desired. The masked span command will apply the mask to the span as it is generated. A "1" bit will cause the generated pixel to be updated to the frame buffer 24. Similarly, a "0" mask bit will inhibit updating the frame buffer for that generated pixel. One mask word is provided for each 32or fewer bits of span width, e.g., enough mask words must be provided to cover the span. In the specific embodiment presented, values for the X and Y coordinates are preferably 16 bit 2's integers. The X and Y values will have 12 bit of integer and 4 bits of fraction when sub-pixel addressing is enabled. The delta colors, in like manner, are 2's complement values with 9 bits of integer and 16 bits of fraction. Color interpretation of 8 bit index or 24 bit true color is supported in the implementation being described. 24 bit true color mode interpolates all 3 color spans. The result may be color compressed to an 8 bit or 16 bit true color pixel as desired. 8 bit per pixel color mode only will use the blue initial and delta parameters to produce an 8 bit pixel directly.

Figure 5:
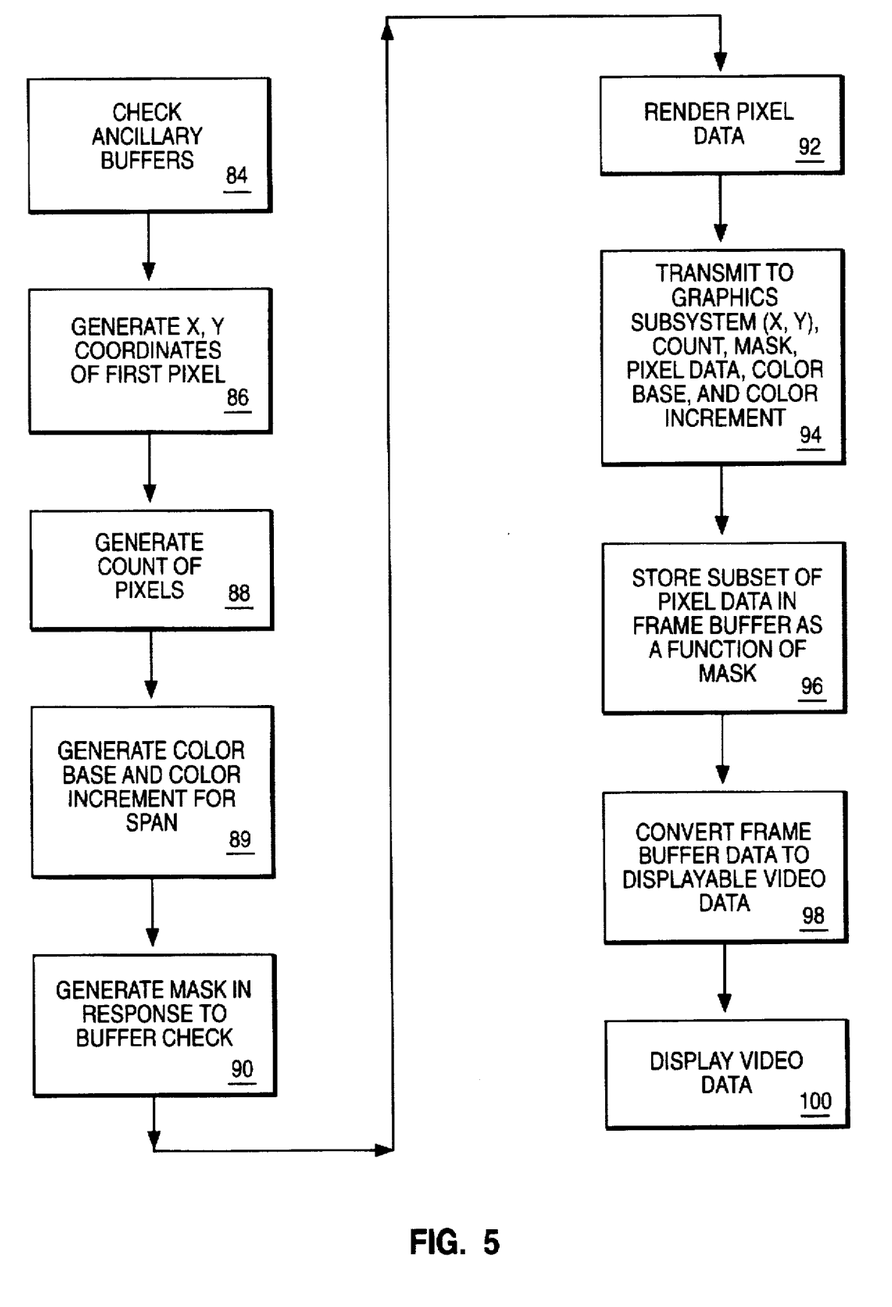
FIG. 5 is a flow diagram illustrating the flow of operation of the components of FIG. 1 in accordance with the invention.

Referring to FIG. 5, depicted therein is a simplified high level flow diagram of operation of the invention wherein, block 84 represents the first step wherein the main processor 11 of the host computer executes the "Z" or depth checks and other checks against the ancillary buffers contained in the main memory 12. As a result of the buffer checking and rendering, the processor 11 determines which pixels of a pixel set will be rendered. The address 50 (FIG. 3) of the first pixel of the pixel set for which information will be transferred across the bus will be generated, shown at block 86. Next, the processor 11 will generate a count of the pixel information to be transferred, shown at block 88 (see FIG. 3, reference numeral 56 in the addressing format diagram). The processor will also generate the initial and primitive data structure components of color increment and color base as required wherein interpreted color of the span as desired. The main system processor 11 will thereafter, again in response to this ancillary buffer checking of block 84, generate the appropriate mask component of the control information 52 of FIG. 3—specifically the mask 126. This step is shown in FIG. 5 at block 90. The pixel data 54 (FIG. 3) will also be generated by the main processor 11 such that the pixels may be rendered, shown at block 92.

Finally, once the necessary components of the data structure of FIG. 3 have been generated in accordance with the invention, they will be transmitted across the bus from the host to the graphics adapter, shown at block 94, FIG. 5 in a burst mode. Specifically, the previously generated X,Y coordinate of the first pixel, the pixel count, mask, color base and color increment and pixel data shown in FIG. 3, e.g., the initial and primitive data structures of FIGS. 3 and 4 will be transmitted across the bus to the graphics adapter processor 22 in the graphics subsystem such as the graphics adapter 20.

The graphics adapter processor will then operate upon the information thus transmitted across the bus so as to cause storing of pixel data in the frame buffer 24 as a function of this data, and, in particular, as a function of the mask. This step is shown in FIG. 5 at block 96. Next, in a conventional manner, the thus-stored pixel data in the frame buffer 24 is converted to video data format, block 98, by use of the RAMDAC 25A (FIG. 2) whereupon this video data is then utilized to effect the desired visual display, block 100.

Although a particular embodiment of the invention has now been described, the invention is not intended to be limited to this embodiment and admits to numerous variations. For example, in a typical personal computer (as distinguished from a more high-powered workstation for example), an integrated memory controller checking function 30 may not necessarily be provided. Nevertheless, by utilizing the teachings of the invention regarding the data structures disclosed herein and the mask in conjunction with the burst mode across the bus and avoidance of transfer of individual spans associated with the visible or rendered pixels, the benefits of the invention may nevertheless still be realized notwithstanding the fact that the checking function of the dedicated memory controller may not be present.

A key feature of this mask information structure regardless of its size is that it essentially is providing across the limited-bandwidth bus a composite of all the 3D type ancillary buffer checks such as the depth or Z check which the main processor 11 and memory controller 30 have performed.

While the invention has been shown and described with reference to particular embodiments thereof, it will be understood by those skilled in the art that the foregoing and other changes in form and detail may be made therein without departing from the spirit and scope of the invention.

We claim:

1. A computerized graphics system comprising:
  host computer system means for generating a masked span data structure, said host computer system means including at least one ancillary buffer means for storing information relating to a three-dimensional image; and
  memory controller means interconnected to said ancillary buffer means for examining said buffer means and generating said span mask in response to said examining, said data structure including a span mask of bits each associated with a different pixel of a 3D image, and wherein each said bit of said span mask indicates whether or not a corresponding said different pixel is to be stored in said frame buffer means of said graphical subsystem means, and said data structure further including a poly span command word including
an initial data structure; and
a primitive data structure including a span mask;
graphics subsystem means, including
frame buffer means;
graphics processor means interconnected to said frame buffer means for causing storage in said frame buffer means of representations of pixels as a function of said data structure; and
wherein said graphics processor means further includes means for causing storage, as a function of said span mask, of a subset of a set of pixel data generated by said graphics processor means;
bus means interconnecting said host computer system means and said graphics subsystem means for transmitting said data structure from said host computer system means to said graphics subsystem means;
said data structure further comprising an accede defining a span from the group comprised of at least a poly masked span; and a poly masked span with interpolated color.

2. The apparatus of claim 1 wherein said command word further includes a data structure count.

3. The apparatus of claim 2 wherein said initial data structure defines a color increment associated with said span; and
said primitive data structure defines a color base associated with said span.

4. The apparatus of claim 3 wherein said poly masked span is of a general form wherein
said initial data structure is of the form: [delR], [delG], [delB]; and wherein said primitive data structure is of the form: {[inR], [inG], [inB], $[x_n, y_n]$ [−.W], [Mask]}.

* * * * *

UNITED STATES PATENT AND TRADEMARK OFFICE
CERTIFICATE OF CORRECTION

PATENT NO : 5,790,125
DATED : Aug. 4, 1998
INVENTOR(S) : Bui et al

It is certified that error appears in the above-identified patent and that said Letters Patent is hereby corrected as shown below:

Column 14, line 1: change "accede" to --opcode--.

Signed and Sealed this

Nineteenth Day of January, 1999

Attest:

Attesting Officer

Acting Commissioner of Patents and Trademarks